US010816065B2

United States Patent
Kim et al.

(10) Patent No.: US 10,816,065 B2
(45) Date of Patent: Oct. 27, 2020

(54) TRIPLE PULLEY BELT AUTO TENSIONER AND ENGINE PROVIDED WITH THE SAME

(71) Applicants: HYUNDAI MOTOR COMPANY, Seoul (KR); KIA MOTORS CORPORATION, Seoul (KR)

(72) Inventors: Sangyun Kim, Hwaseong-si (KR); Jae Ik Ahn, Hwaseong-si (KR); Ji Sung Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 403 days.

(21) Appl. No.: 15/824,242

(22) Filed: Nov. 28, 2017

(65) Prior Publication Data
US 2019/0120344 A1    Apr. 25, 2019

(30) Foreign Application Priority Data

Oct. 24, 2017 (KR) .................. 10-2017-0138101

(51) Int. Cl.
*F16H 7/12* (2006.01)
*F02B 67/06* (2006.01)
*F16H 7/08* (2006.01)

(52) U.S. Cl.
CPC .......... *F16H 7/1263* (2013.01); *F02B 67/06* (2013.01); *F16H 2007/0806* (2013.01); *F16H 2007/0842* (2013.01); *F16H 2007/0865* (2013.01); *F16H 2007/0874* (2013.01); *F16H 2007/0891* (2013.01); *F16H 2007/0897* (2013.01)

(58) Field of Classification Search
CPC ..... F16H 2007/0865; F16H 2007/0874; F16H 7/08; F16H 7/1263; F16H 2007/0806; F16H 2007/0808; F16H 2007/0842; F16H 2007/0844; F16H 2007/0891; F16H 2007/0895; F16H 2007/0897
See application file for complete search history.

(56) References Cited

U.S. PATENT DOCUMENTS

| | | | | |
|---|---|---|---|---|
| 691,538 A | * | 1/1902 | Frigerio | .................... F16H 7/02 474/87 |
| 1,257,660 A | * | 2/1918 | Willis | ............................ 474/109 |
| 1,575,655 A | * | 3/1926 | Stinson | .................. B65G 47/95 198/360 |

(Continued)

FOREIGN PATENT DOCUMENTS

| JP | 9-240309 A | 9/1997 |
|---|---|---|
| KR | 10-1998-062825 A | 10/1998 |

*Primary Examiner* — Michael R Mansen
*Assistant Examiner* — Raveen J Dias
(74) *Attorney, Agent, or Firm* — Morgan, Lewis & Bockius LLP (57) ABSTRACT

An automatic belt tensioner for a hybrid vehicle is disclosed. The automatic belt tensioner includes an arm body including an upper arm on which first and second idlers are mounted and a lower arm on which a third idler is mounted. The automatic belt tensioner further includes a spring provided between the upper arm and the lower arm and providing elastic force for relative longitudinal movement of the upper arm and the lower arm, and a rail bracket mounting the arm body on an engine and guiding relative longitudinal vertical motion of the arm body.

10 Claims, 11 Drawing Sheets

(56) References Cited

U.S. PATENT DOCUMENTS

| | | | | |
|---|---|---|---|---|
| 1,578,700 | A * | 3/1926 | Anderson | B61D 43/00 105/103 |
| 2,098,573 | A * | 11/1937 | Dingle | B42B 4/00 198/814 |
| 3,598,194 | A * | 8/1971 | Wappler | B60K 17/36 180/6.2 |
| 3,602,054 | A * | 8/1971 | Monteith | F16H 7/1236 474/109 |
| 3,630,096 | A * | 12/1971 | Brewer | F16H 7/1263 474/132 |
| 3,926,063 | A * | 12/1975 | Mayfield | F16H 7/1254 474/132 |
| 4,068,535 | A * | 1/1978 | Sheets | F16H 7/1254 474/132 |
| 5,938,551 | A * | 8/1999 | Warner | F16H 7/1263 474/111 |
| 6,117,034 | A * | 9/2000 | Vine | F16H 7/1263 474/134 |
| 7,901,310 | B2 | 3/2011 | Lolli et al. | |
| 2002/0039943 | A1* | 4/2002 | Serkh | F16H 7/1218 474/134 |
| 2003/0176250 | A1* | 9/2003 | Austin | F02B 67/06 474/134 |
| 2004/0045519 | A1* | 3/2004 | Buglione | F02N 15/08 123/179.25 |
| 2005/0181901 | A1* | 8/2005 | Shin | F16H 7/1218 474/134 |
| 2015/0345597 | A1* | 12/2015 | Walter | B60K 25/00 474/134 |
| 2018/0195483 | A1* | 7/2018 | Serkh | F02B 67/06 |
| 2018/0355954 | A1* | 12/2018 | Kim | F16H 7/12 |
| 2018/0363743 | A1* | 12/2018 | Chang | F16H 7/1281 |
| 2019/0024763 | A1* | 1/2019 | Lebender | F16H 7/1281 |
| 2019/0178353 | A1* | 6/2019 | Singh | F16H 7/0829 |

* cited by examiner

TRIPLE PULLEY BELT AUTO TENSIONER
AND ENGINE PROVIDED WITH THE SAME

CROSS-REFERENCE TO RELATED APPLICATION

This application claims priority to and the benefit of Korean Patent Application No. 10-2017-0138101 filed in the Korean Intellectual Property Office on Oct. 24, 2017, the entire contents of which are incorporated herein by reference.

BACKGROUND

(a) Field

The present invention relates to a tripe pulley belt auto tensioner and an engine provided with the same, and more particularly, to a tripe pulley belt auto tensioner capable of dispersing tension applied to a belt and an engine provided with the same.

(b) Related Art

A general tensioner which is a device that prevents a timing chain or belt from loosening absorbs changes in tension to prevent deterioration of chain or belt noise and enhance durability.

In a general vehicle, two mechanical tensioners are located at the front and rear of an alternator, which may adversely affect engine layout, cost, and weight.

Since two tensioners are mounted between an engine block and the alternator, the alternator needs to be moved to the outside of the engine so that a layout of the entire engine is limited.

In addition, when a shear tensioner in an alternator rotating direction is operated, tension of the belt continuously significantly increases as each tensioner moves independently.

That is, a local tension change of the belt is increased.

The above information disclosed in this Background section is only for enhancement of understanding of the background. Applicant notes that this section may contain information available before this application. However, by providing this section, Applicant does not admit that any information contained in this section constitutes prior art.

SUMMARY

The present invention has been made in an effort to provide a triple pulley belt auto tensioner capable of dispersing tension applied to a belt and an engine provided with the same.

The present invention has also been made in an effort to provide a triple pulley belt auto tensioner applied to a hybrid engine to adjust tension of an auxiliary machinery belt and maintain the tension and an engine provided with the same.

An embodiment of the present invention provides a triple pulley belt auto tensioner including: an arm body including an upper arm on which first and second idlers are mounted and a lower arm on which a third idler is mounted; a spring provided between the upper arm and the lower arm and providing elastic force for relative longitudinal movement of the upper arm and the lower arm; and a rail bracket mounting the arm body on an engine and guiding relative longitudinal vertical motion of the arm body.

The upper arm may include a main arm on which the first idler is mounted, and a sub arm formed to be branched from the main arm and mounted with the second idler.

The upper arm may include a guide rail formed in a longitudinal direction thereof, the lower arm may include a container having a container guide hole into which the guide rail is inserted, and the spring may be inserted into the container.

The upper arm may further include an end plate formed on one end of the guide rail, and the spring may be inserted into the container and elastically support the end plate.

The triple pulley belt auto tensioner may further include a guider provided between the rail bracket and the upper arm.

A guider hole into which the rail bracket is inserted may be formed in the guider.

The upper arm may include the guide rail formed in the longitudinal direction thereof, and a guider wall guiding longitudinal movement of the guide rail may be formed in the guider.

The triple pulley belt auto tensioner may further include a damping bush provided between the rail bracket and the guider.

Another embodiment of the present invention provides an engine including: a triple pulley belt auto tensioner including an arm body including an upper arm on which first and second idlers are mounted and a lower arm on which a third idler is mounted, a spring provided between the upper arm and the lower arm and providing elastic force for relative longitudinal movement of the upper arm and the lower arm, and a rail bracket mounting the arm body on an engine and guiding relative longitudinal vertical motion of the arm body; a crankshaft pulley; an auxiliary drive device pulley; a motor/generator pulley; and a belt connecting the first, second, and third idlers, the crankshaft pulley, the auxiliary drive device pulley, and the motor/generator pulley.

The first idler may be disposed between the crankshaft pulley and the motor/generator pulley, the second idler may be disposed between the motor/generator pulley and the auxiliary drive device pulley, and the third idler may be disposed between the auxiliary drive device pulley and the crankshaft pulley.

According to embodiments of the present invention by a triple pulley belt auto tensioner and an engine provided with the same, tension applied to a belt can be dispersed.

According to embodiments of the present invention, by the triple pulley belt auto tensioner and the engine provided with the same, vibration and noise of the belt can be reduced by the tension dispersion.

According to embodiments of the present invention, by the triple pulley belt auto tensioner and the engine provided with the same, two mechanical tensioners at the front and rear of a motor/generator can be combined into one to increase a degree of freedom of a layout and decrease cost.

According to embodiments of the present invention, by the triple pulley belt auto tensioner and the engine provided with the same, an engine layout can be simplified and the number of tensioners can be decreased, thereby reducing a weight and enhancing the fuel efficiency of a vehicle.

DETAILED DESCRIPTION

In the following detailed description, embodiments of the present invention have been shown and described.

As those skilled in the art would realize, the described embodiments may be modified in various different ways, all without departing from the spirit or scope of the present invention Through the specification, like reference numerals designate like elements throughout the specification.

When it is described that a certain part such as a layer, a region, a substrate, etc., is located "above" another part, it means that the certain part may be located "directly above" on the another part and a third part may be interposed therebetween as well.

In contrast, when an element is referred to as being "directly on" another element, there are no intervening elements present.

Throughout the specification, unless explicitly described to the contrary, the word "comprise" and variations such as "comprises" or "comprising", will be understood to imply the inclusion of stated elements but not the exclusion of any other elements.

Embodiments of the present invention will hereinafter be described in detail with reference to the accompanying drawings.

An aspect of the invention provides an automatic belt tensioner for a hybrid vehicle. The belt tensioner includes three belt idlers (pulley) 21, 22, 23. The automatic belt tensioner includes a first arm 40 on which a first idler 21 and a second idler 22 are mounted, and a second arm 50 on which a third idler 23 is rotatably mounted.

In embodiments, when viewed from a side of the engine as in FIGS. 8-11, rotational axes of the crankshaft pulley 101, auxiliary drive device pulley 103 and motor/generator pulley 105 are rotatably fixed to a body/frame of the engine 10. Distance between two of the three pulleys 101, 103, 105 are fixed.

In embodiments, the first arm 40 and the second arm 50 are slidably engaged using a first slide mechanism 44, 46, 60. The first arm 40 and the second arm 50 slide along a first direction along the guide rail 44. Distance between the two arms along the first direction (a first distance between the first idler 21 and the third idler 23 along the first direction) changes to balance force applied to the two arms by tension of a belt 107 and elastic force of the spring 60. Elasticity of the spring 60 is adjustable to set a target tension of the belt 107. In embodiments, the first arm 40 and the second arm 50 are further configured to slide a long a second direction different from the first direction along a second rail 70, 72. Accordingly, changes along the first direction according to changes of the belt's tension.

In embodiments, when viewed from a side of the engine as in FIGS. 8-11, a first imaginary line connecting rotational axes of the crankshaft pulley 101 and the motor/generator pulley 105 crosses a second imaginary line connecting the first and third idlers 21, 23 such that the crankshaft pulley 101, the first sliding mechanism 44, 46, 60 and the motor/generator pulley 105 are arranged in order along the first imaginary line. In embodiments, when viewed from a side of the engine as in FIGS. 8-11, a third imaginary line connecting rotational axes of the auxiliary drive device pulley 103 and the motor/generator pulley 105 crosses a fourth imaginary line connecting the first and second idlers 21, 22.

Figure 1:
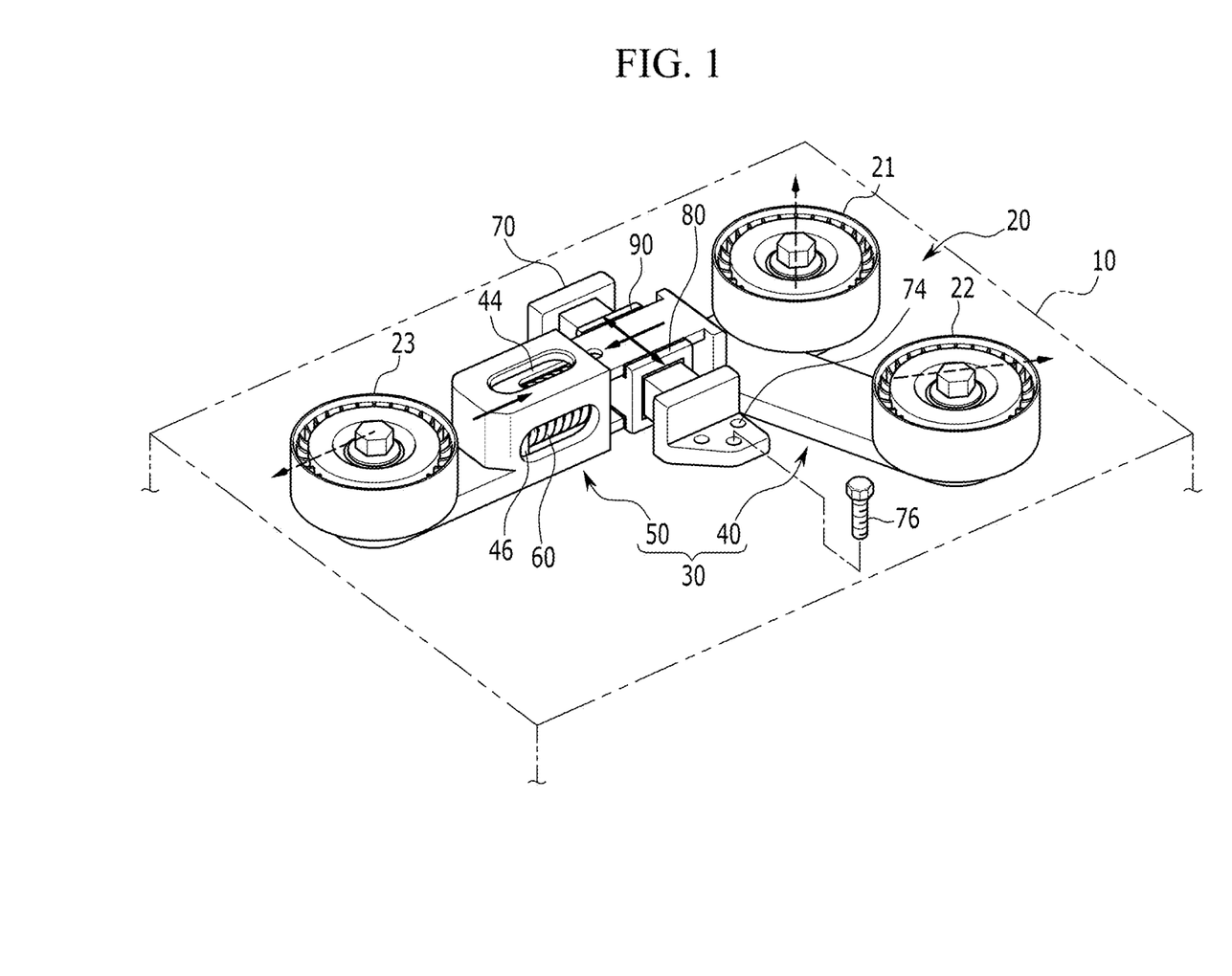
FIG. 1 is a perspective view of a triple pulley belt auto tensioner according to embodiments of the present invention.

FIG. 1 is a perspective view of a triple pulley belt auto tensioner according to an embodiments of the present invention, FIGS. 2 to 7 are perspective views of the triple pulley belt auto tensioner according to embodiments of the present invention, and FIGS. 8 to 11 are diagrams for describing an operation of an engine on which the triple pulley belt auto tensioner is mounted according to embodiments of the present invention.

Referring to FIGS. 1 to 7, the triple pulley belt auto tensioner 20 according to the exemplary embodiment of the present invention includes an arm body 30 including an upper arm 40 on which first and second idlers 21 and 22 are mounted and a lower arm 50 on which a third idler 23 is mounted, a spring 60 provided between the upper arm 40 and the lower arm 50 and providing elastic force for relative longitudinal movement of the upper arm 40 and the lower arm 50, and a rail bracket 70 mounting the arm body 30 on an engine 10 and guiding relative longitudinal vertical motion of the arm body 30.

Figure 2:
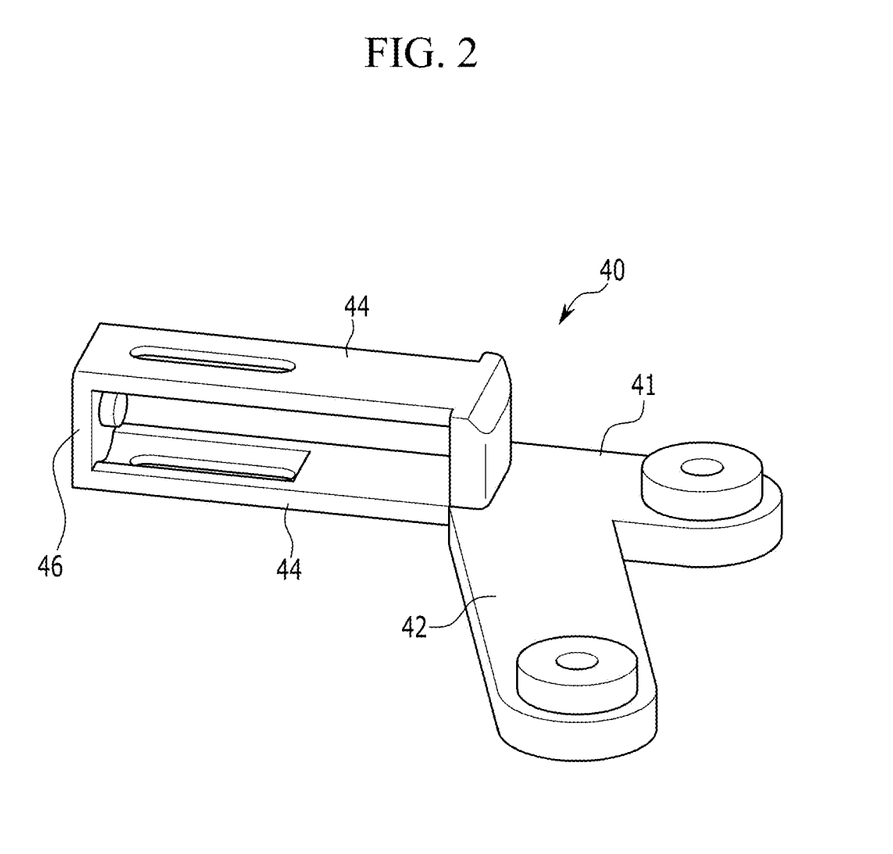
FIGS. 2 to 7 are perspective views of the triple pulley belt auto tensioner according to embodiments of the present invention.
Figure 3:
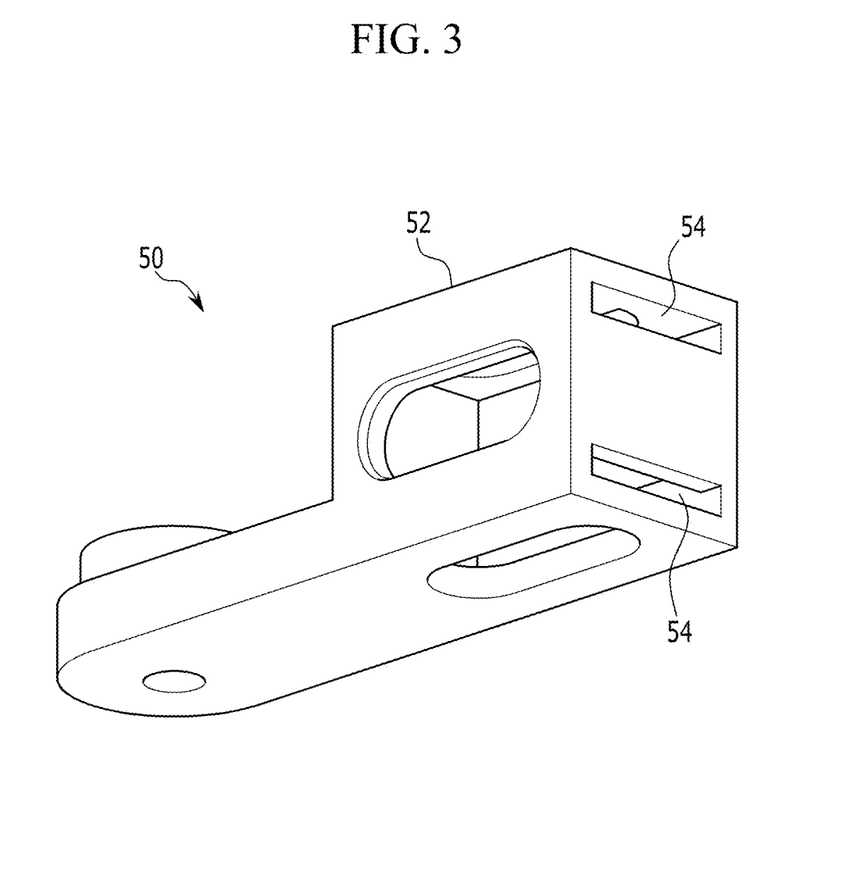

Referring to FIGS. 1 to 3, the upper arm 40 includes a main arm 41 on which the first idler 21 is mounted and a sub arm 42 formed to be branched from the main arm 41 and mounted with the second idler 22.

The upper arm 40 includes a guide rail 44 formed in a longitudinal direction thereof, the lower arm 50 has a container 52 having a container guide hole 54 into which the guide rail 44 is inserted, and the spring 60 may be inserted into the container 52.

The upper arm 40 may further include an end plate 46 formed at one end of the guide rail 44 and the spring 60 is inserted into the container 52 to elastically support the end plate 46.

Figure 4:
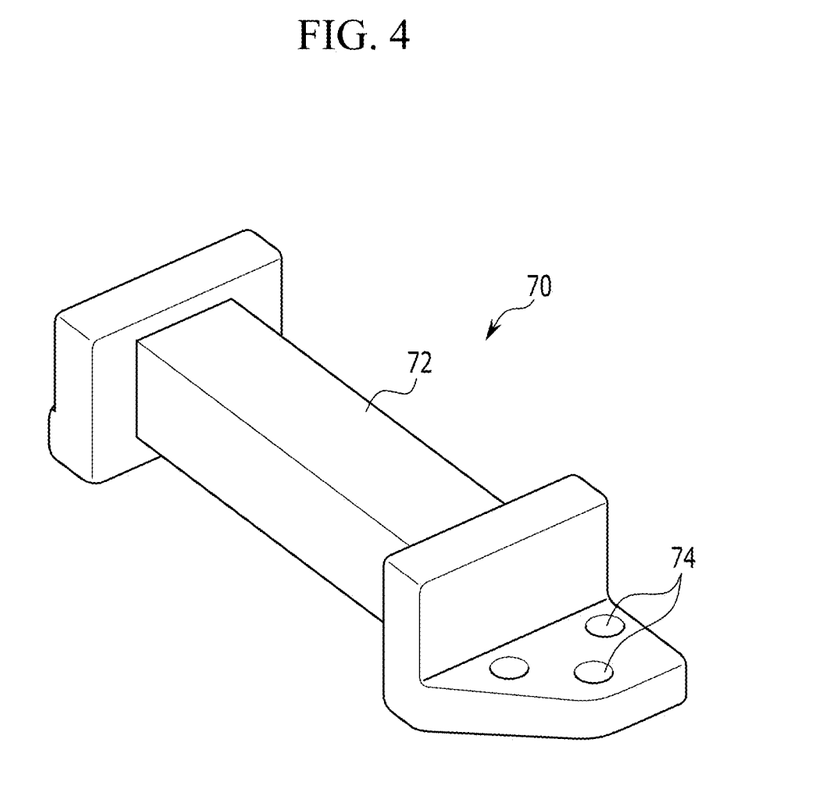
Figure 5:
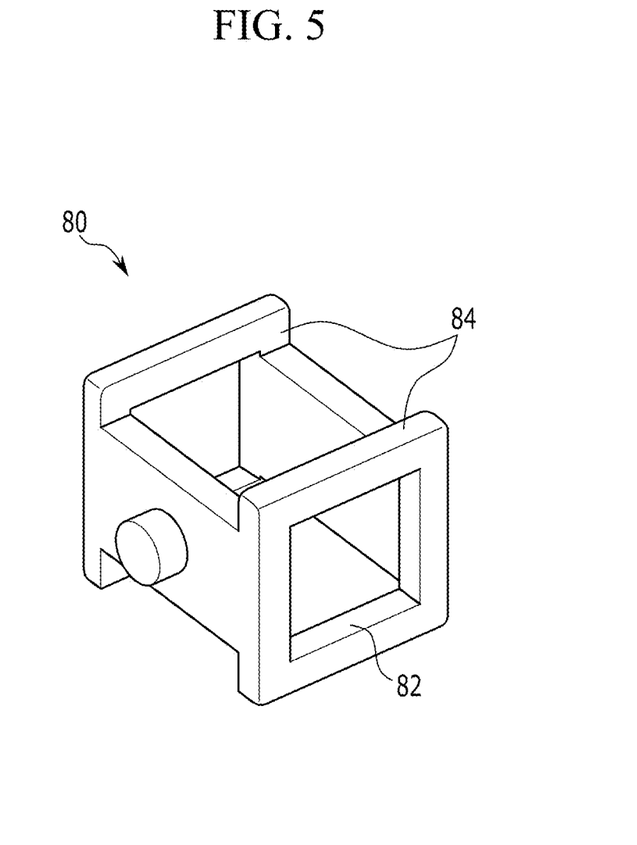

Referring to FIGS. 1, 4, and 5, the triple pulley belt auto tensioner 20 according to the exemplary embodiment of the present invention further includes a guider 80 provided between the rail bracket 70 and the upper arm 40.

A guider hole 82 into which the rail bracket 70 is inserted and a guider wall 84 for guiding longitudinal movement of the guide rail 44 may be formed in the guider 80.

A rail rod 72 may be formed on the rail bracket 70 and the rail rod 72 may be movably inserted into the guider hole 82. Further, a rail hole 74 for mounting the rail bracket 70 on the engine 10 through a bolt 76 may be formed on the rail bracket 70.

Figure 6:
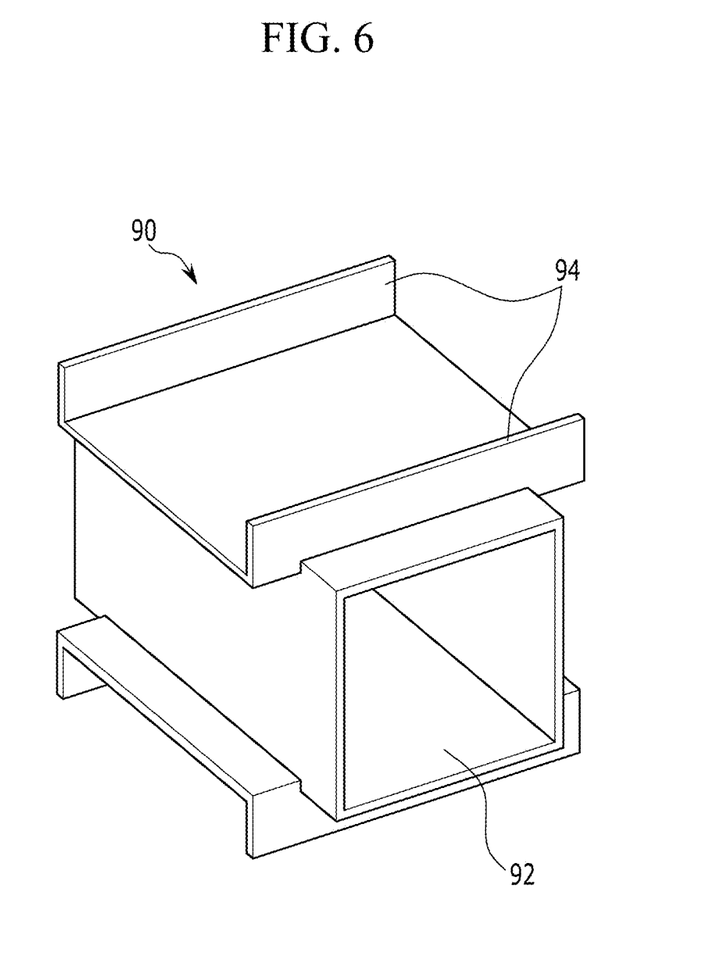
Figure 7:
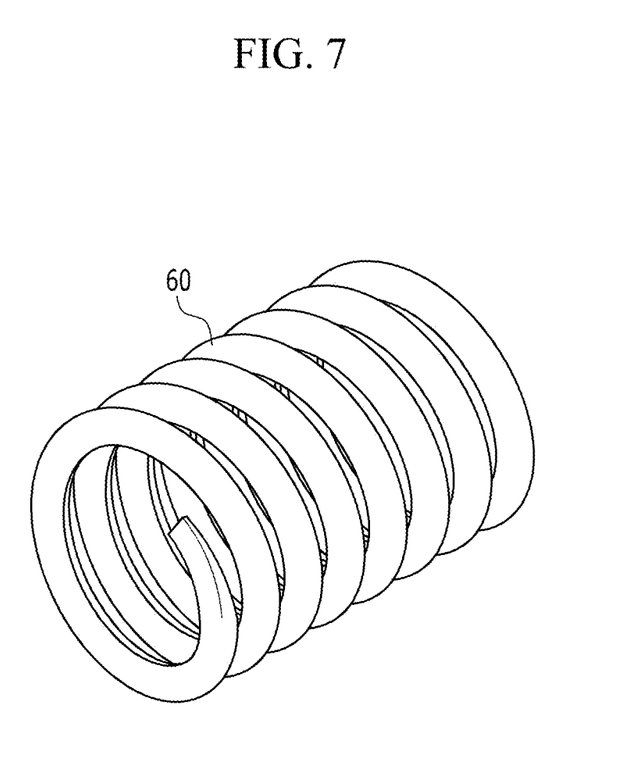

Referring to FIGS. 1, 5, and 6, the triple pulley belt auto tensioner 20 according to the exemplary embodiment of the present invention further includes a damping bush 90 provided between the rail bracket 70 and the guider 80.

The damping bush 90 provides damping force for relative movement between the rail bracket 70 and the guider 80. That is, the damping bush 90 includes a bush hole surface 92 and a bush wall surface 94 having a shape corresponding to the guider hole 82 and the guider wall 84 to thereby provide the damping force for the relative movement of the rail bracket and the guider 80.

FIGS. 8 to 11 are diagrams for describing an operation of an engine on which the triple pulley belt auto tensioner is mounted according to the exemplary embodiment of the present invention.

Referring to FIGS. 1 and 8 to 11, the engine according to the exemplary embodiment of the present invention includes the triple pulley belt auto tensioner 20, a crankshaft pulley 101, an auxiliary drive device pulley 105, a motor/generator pulley 103, and a belt 107 connecting the first, second, and third idlers 21, 22, and 23, the crankshaft pulley 101, the auxiliary drive device pulley 105, and the motor/generator pulley 103.

The auxiliary drive device pulley 105 may be any one of a pulley for an air conditioner compressor, a pulley for an oil pump, or a pulley for a coolant pump.

The motor/generator pulley 103 may be connected to a mild hybrid starter generator (MHSG).

That is, the engine equipped with the triple pulley belt auto tensioner according to the exemplary embodiment of the present invention is a hybrid engine, and driving force of the mild hybrid starter generator (MHSG) is transmitted to the crankshaft pulley 101 through the motor/generator pulley 103 to start the engine 10, generate power by driving the engine 10, and assist driving the engine 10.

The first idler 21 may be disposed between the crankshaft pulley 101 and the motor/generator pulley 103, the second idler 22 may be disposed between the motor/generator pulley 103 and the auxiliary drive device pulley 105, and the third idler 23 may be disposed between the auxiliary drive device and the crankshaft pulley 101.

In a general vehicle, two mechanical tensioners are located at the front and rear of an alternator, which adversely affects engine layout, cost, and weight.

The triple pulley belt auto tensioner and the engine provided with the same according to the exemplary embodiments of the present invention may simplify the layout of the entire engine by applying one triple pulley belt auto tensioner 20.

In the triple pulley belt auto tensioner and the engine provided with the same according to the exemplary embodiments of the present invention, the first idler 21 and the second idler 22 may be mounted on the upper arm 40, the third idler 23 may be mounted on the lower arm 50, relative distances of the upper arm 40 and the lower arm 50 may be changed, and relative positions of the upper arm 40 and the lower arm 50 may be changed to minimize a change of local tension of the belt 107.

Hereinafter, operations of the triple pulley belt auto tensioner and the engine provided with the same according to the exemplary embodiments of the present invention will be described with reference to FIGS. 1 to 11.

In the drawings, it is assumed that the crankshaft pulley 101 and the motor/generator pulley 103 rotate clockwise.

Figure 8:
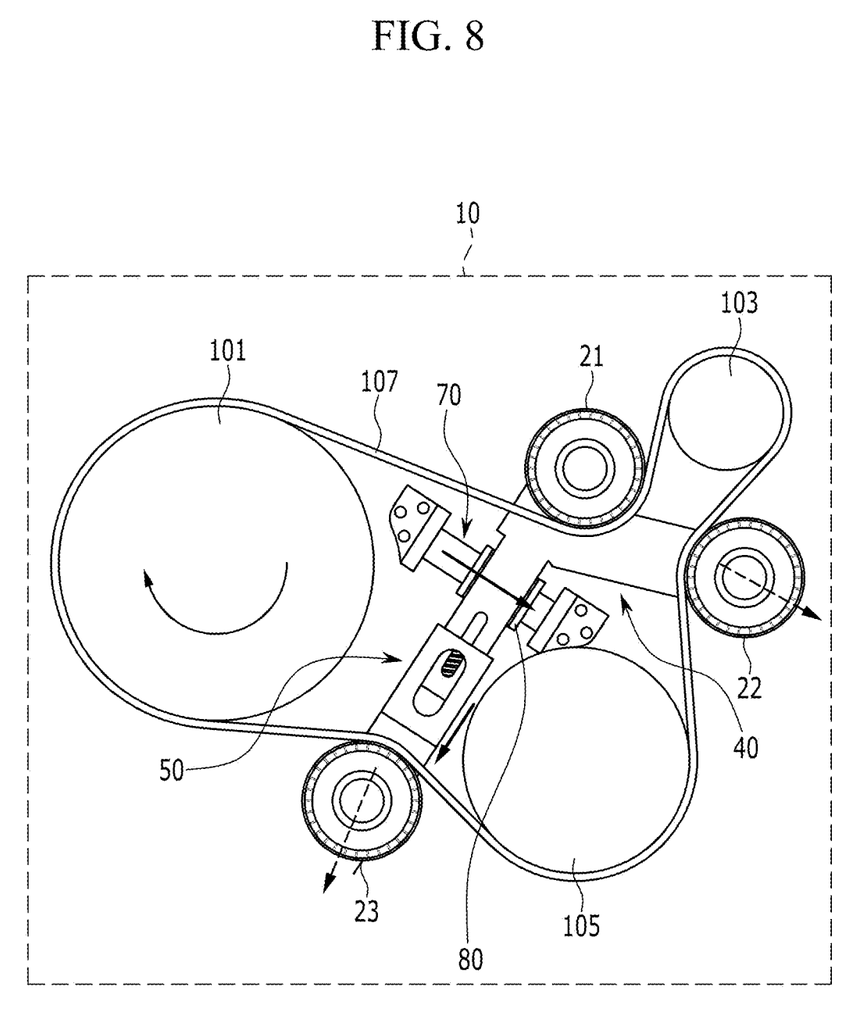
FIGS. 8 to 11 are diagrams for describing an operation of an engine on which the triple pulley belt auto tensioner is mounted according to embodiments of the present invention.

FIG. 8 is a diagram illustrating an operation in a charging condition of the engine provided with the triple pulley belt auto tensioner according to the exemplary embodiment of the present invention.

In the charging condition, between the crankshaft pulley 101 and the auxiliary drive device pulley 105 and between the auxiliary drive device pulley 105 and the motor/generator pulley 103, the local tension of the belt 107 increases and between the motor/generator pulley 103 and the crankshaft pulley 101, the local tension of the belt 107 decreases.

By the increase of the tension between the crankshaft pulley 101 and the auxiliary drive device pulley 105, the third idler 23 receives force in an arrow direction and the lower arm 50 relatively moves in a downward direction. By the increase of the tension between the auxiliary drive device pulley 105 and the motor/generator pulley 103, the second idler 22 receives the force in the arrow direction and the arm body 30 relatively moves to the right side of the figure.

Since the local tension of the belt 107 between the motor/generator pulley 103 and the crankshaft pulley 101 is reduced, but the first idler 21 moves to the right side of the figure, the tension applied to the belt 107 is dispersed to suppress the local tension change of the belt 107.

Figure 9:
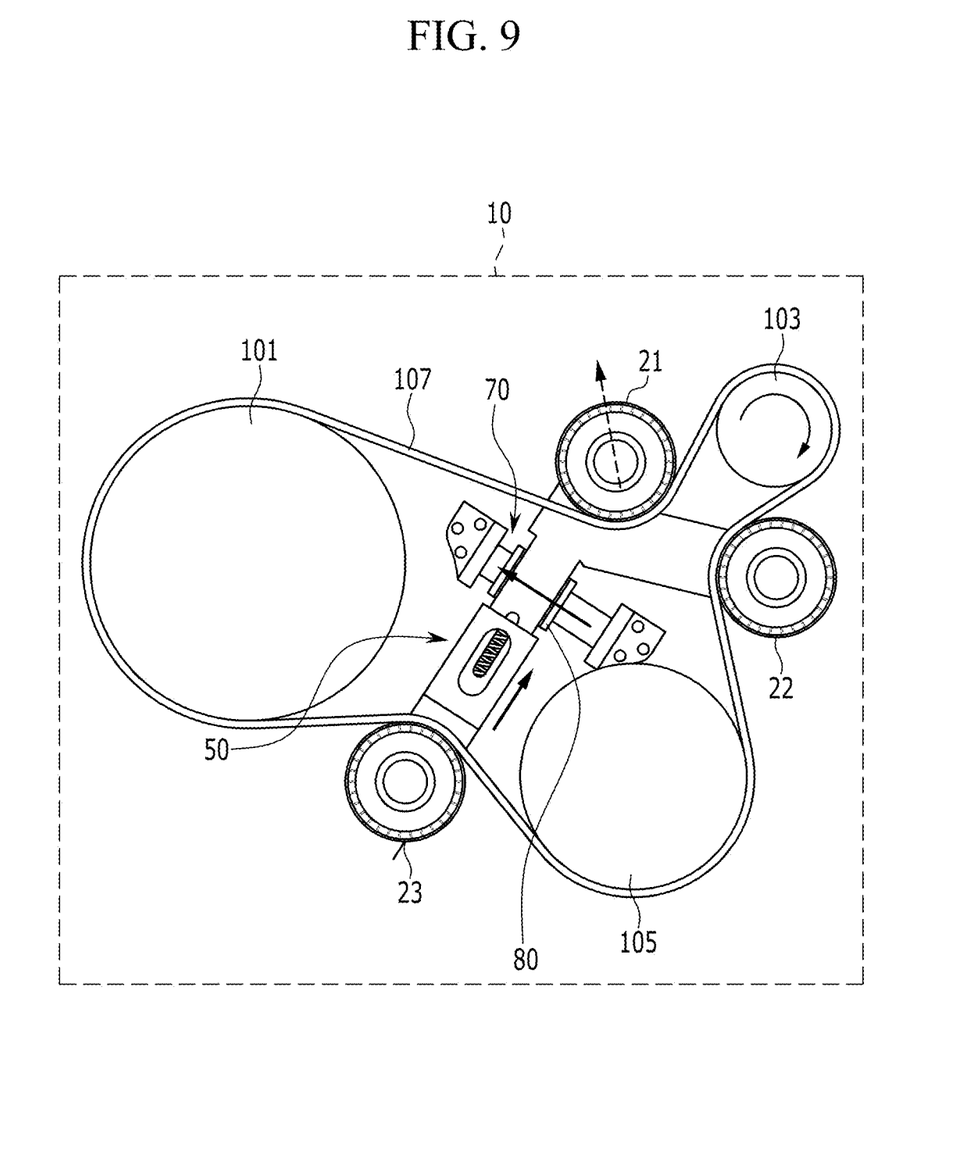

FIG. 9 is a diagram illustrating an operation in a start condition of the engine provided with the triple pulley belt auto tensioner according to the exemplary embodiment of the present invention.

In the start condition, between the crankshaft pulley 101 and the auxiliary drive device pulley 105 and between the auxiliary drive device pulley 105 and the motor/generator pulley 103, the local tension of the belt 107 decreases and between the motor/generator pulley 103 and the crankshaft pulley 101, the local tension of the belt 107 increases.

By the increase of the local tension of the belt 107 between the motor/generator pulley 103 and the crankshaft pulley 101, the first idler 21 receives the force in the arrow direction and the arm body 30 relatively moves to the left side of the figure.

Since the second idler 22 also moves to the left side of the figure, it is possible to suppress the local tension change of the belt 107 between the auxiliary drive device pulley 105 and the motor/generator pulley 103.

The lower arm 50 moves relatively upward due to a decrease in tension between the crankshaft pulley 101 and the auxiliary drive device pulley 105 so as to suppress the local tension change between the crankshaft pulley 101 and the auxiliary drive device pulley 105.

Figure 10:
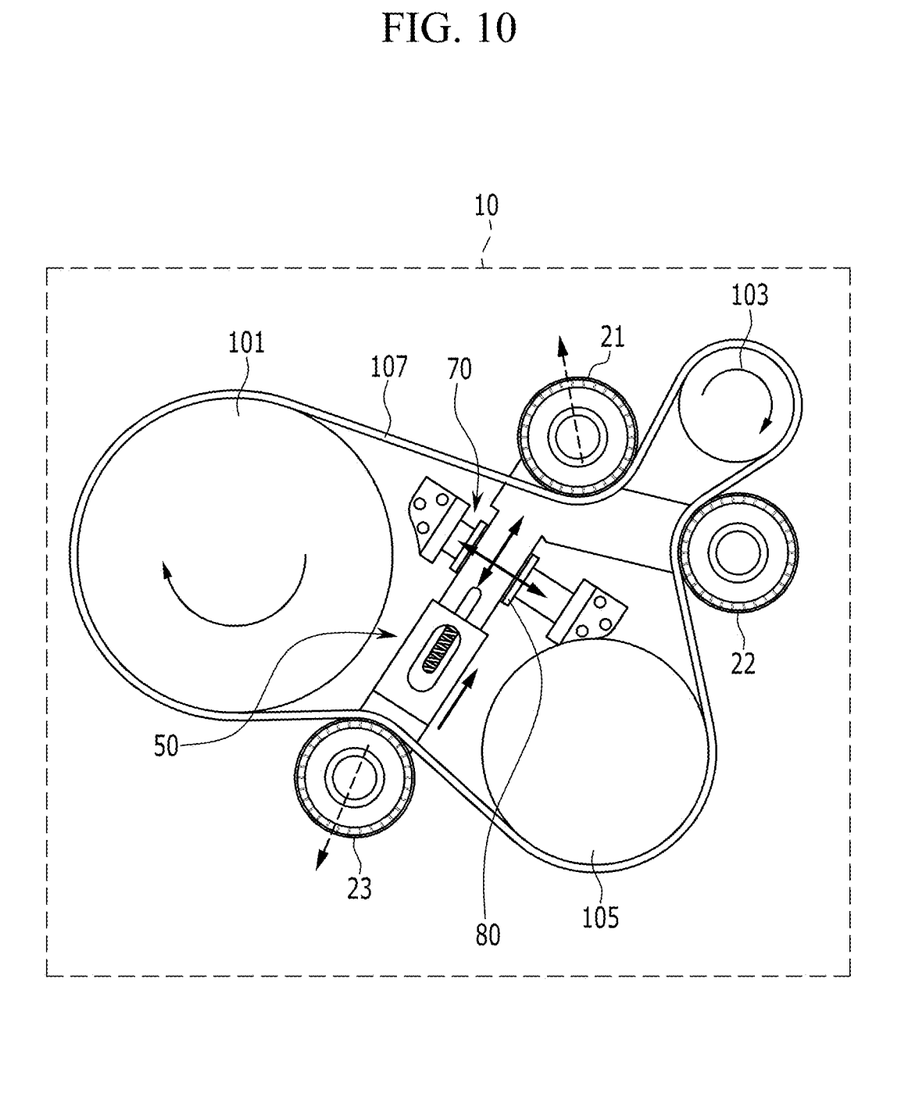

FIG. 10 is a diagram illustrating an operation in a boosting condition of the engine provided with the triple pulley belt auto tensioner according to the exemplary embodiment of the present invention.

In the boosting condition, between the auxiliary drive device pulley 105 and the motor/generator pulley 103, the local tension of the belt 107 decreases and between the crankshaft pulley 101 and the auxiliary drive device pulley 105 and between the motor/generator pulley 103 and the crankshaft pulley 101, the local tension of the belt 107 increases.

By the increase of the local tension of the belt 107 between the motor/generator pulley 103 and the crankshaft pulley 101, the first idler 21 receives the force in the arrow direction and the arm body 30 relatively moves to the left side of the figure.

Since the second idler 22 also moves to the left side of the figure, it is possible to suppress the local tension change of the belt 107 between the auxiliary drive device pulley 105 and the motor/generator pulley 103.

The lower arm 50 moves relatively downward due to the increase in tension between the crankshaft pulley 101 and the auxiliary drive device pulley 105 so as to suppress the local tension change between the crankshaft pulley 101 and the auxiliary drive device pulley 105.

Figure 11:
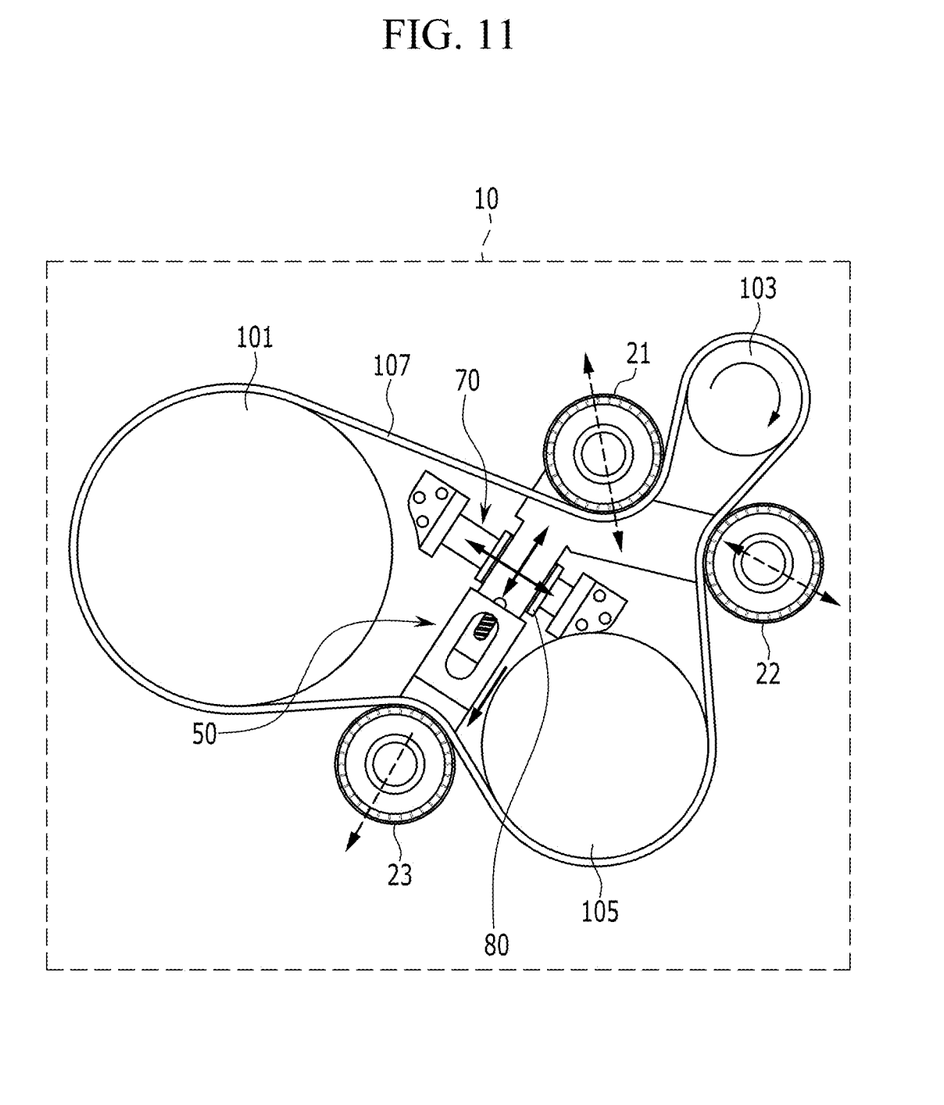

FIG. 11 is a diagram illustrating an operation in an inert driving condition of the engine provided with the triple pulley belt auto tensioner according to the exemplary embodiment of the present invention.

During other operations of the engine, such as the inert driving condition, and the like, the force transmitted to each of the idlers 21, 22, and 23 is varied during and the relative position of the arm body 30 and the relative positions of the upper arm 40 and the lower arm 50 may be varied.

As described above, in the engine 10 equipped with the triple pulley belt auto tensioner 20 according to the exemplary embodiment of the present invention, the relative position of the arm body 30 and the relative positions of the upper arm 40 and the lower arm 50 are varied and the tension change of the belt 107 is reduced.

As described above, according to the exemplary embodiments of the present invention, by the triple pulley belt auto tensioner and the engine provided with the same, the tension applied to the belt is enabled to be dispersed to reduce the vibration and noise of the belt.

Since a single auto tensioner is used, the single auto tensioner is enabled to be easily applied to the existing engine system and applied to various belt systems by adjusting a length and a shape of the arm body 30, and the like.

Since the triple pulley belt auto tensioner according to the exemplary embodiment of the present invention is simple in structure and shape, and has a small number of constituent parts, cost is enabled to be reduced.

The triple pulley belt auto tensioner according to the exemplary embodiment of the present invention is enabled to select optimal belt tension by adjusting rigidity of one spring and improve the fuel efficiency by reducing the belt tension.

The triple pulley belt auto tensioner according to the exemplary embodiment of the present invention is enabled to prevent a decrease in damping force by applying a damping bush capable of generating bi-directional friction.

While this invention has been described in connection with embodiments of the invention, it is to be understood that the invention is not limited to the disclosed embodiments. On the contrary, it is intended to cover various modifications and equivalent arrangements included within the spirit and scope of the appended claims.

<Description of symbols>

| | |
|---|---|
| 10: Engine | 20: Triple pulley belt auto tensioner |
| 21: First idler | 22: Second idler |
| 23: Third idler | 30: Arm body |
| 40: Upper arm | 41: Main arm |
| 42: Sub arm | 44: Guide rail |
| 46: End plate | 50: Lower arm |
| 52: Container | 54: Container guide hole |
| 60: Spring | 70: Rail bracket |
| 72: Rail rod | 74: Rail hole |
| 80: Guider | 82: Guider hole |
| 84: Guider wall | 90: Damping bush |
| 101: Crankshaft pulley | 103: Auxiliary drive device pulley |
| 105: Motor/generator pulley | 107: Belt |

What is claimed is:

1. A triple pulley belt auto tensioner comprising:
   an arm body including an upper arm on which first and second idlers are mounted and a lower arm on which a third idler is mounted;
   a spring provided between the upper arm and the lower arm and providing elastic force for relative longitudinal movement of the upper arm and the lower arm; and
   a rail bracket mounting the arm body on an engine and guiding relative longitudinal vertical motion of the arm body,
   wherein the rail bracket guides the longitudinal vertical motion of the arm body in a direction different from a direction of elastic force provided by the spring.

2. The triple pulley belt auto tensioner of claim 1, wherein:
   the upper arm includes a main arm on which the first idler is mounted, and
   a sub arm formed to be branched from the main arm and mounted with the second idler.

3. The triple pulley belt auto tensioner of claim 1, wherein:
   the upper arm includes a guide rail formed in a longitudinal direction thereof,
   the lower arm includes a container having a container guide hole into which the guide rail is inserted, and
   the spring is inserted into the container.

4. The triple pulley belt auto tensioner of claim 3, wherein:
   the upper arm further includes an end plate formed on one end of the guide rail, and
   the spring is inserted into the container and elastically supports the end plate.

5. The triple pulley belt auto tensioner of claim 1, further comprising: a guider provided between the rail bracket and the upper arm.

6. The triple pulley belt auto tensioner of claim 5, wherein:
   a guider hole into which the rail bracket is inserted is formed in the guider.

7. The triple pulley belt auto tensioner of claim 6, wherein:
   the upper arm includes the guide rail formed in the longitudinal direction thereof, and
   a guider wall guiding longitudinal movement of the guide rail is formed in the guider.

8. The triple pulley belt auto tensioner of claim 5, further comprising: a damping bush provided between the rail bracket and the guider.

9. An engine comprising:
   a triple pulley belt auto tensioner including an arm body including an upper arm on which first and second idlers are mounted and a lower arm on which a third idler is mounted, a spring provided between the upper arm and the lower arm and providing elastic force for relative longitudinal movement of the upper arm and the lower arm, and a rail bracket mounting the arm body on an engine and guiding relative longitudinal vertical motion of the arm body;
   a crankshaft pulley;
   an auxiliary drive device pulley;
   a motor/generator pulley; and
   a belt connecting the first, second, and third idlers, the crankshaft pulley, the auxiliary drive device pulley, and the motor/generator pulley,
   wherein the rail bracket guides the longitudinal vertical motion of the arm body in a direction different from a direction of elastic force provided by the spring.

10. The engine of claim 9, wherein:
    the first idler is disposed between the crankshaft pulley and the motor/generator pulley,
    the second idler is disposed between the motor/generator pulley and the auxiliary drive device pulley, and
    the third idler is disposed between the auxiliary drive device pulley and the crankshaft pulley.

* * * * *